Jan. 6, 1959    A. E. FRIBANCE ET AL    2,867,768
AMMETER
Filed Jan. 19, 1953
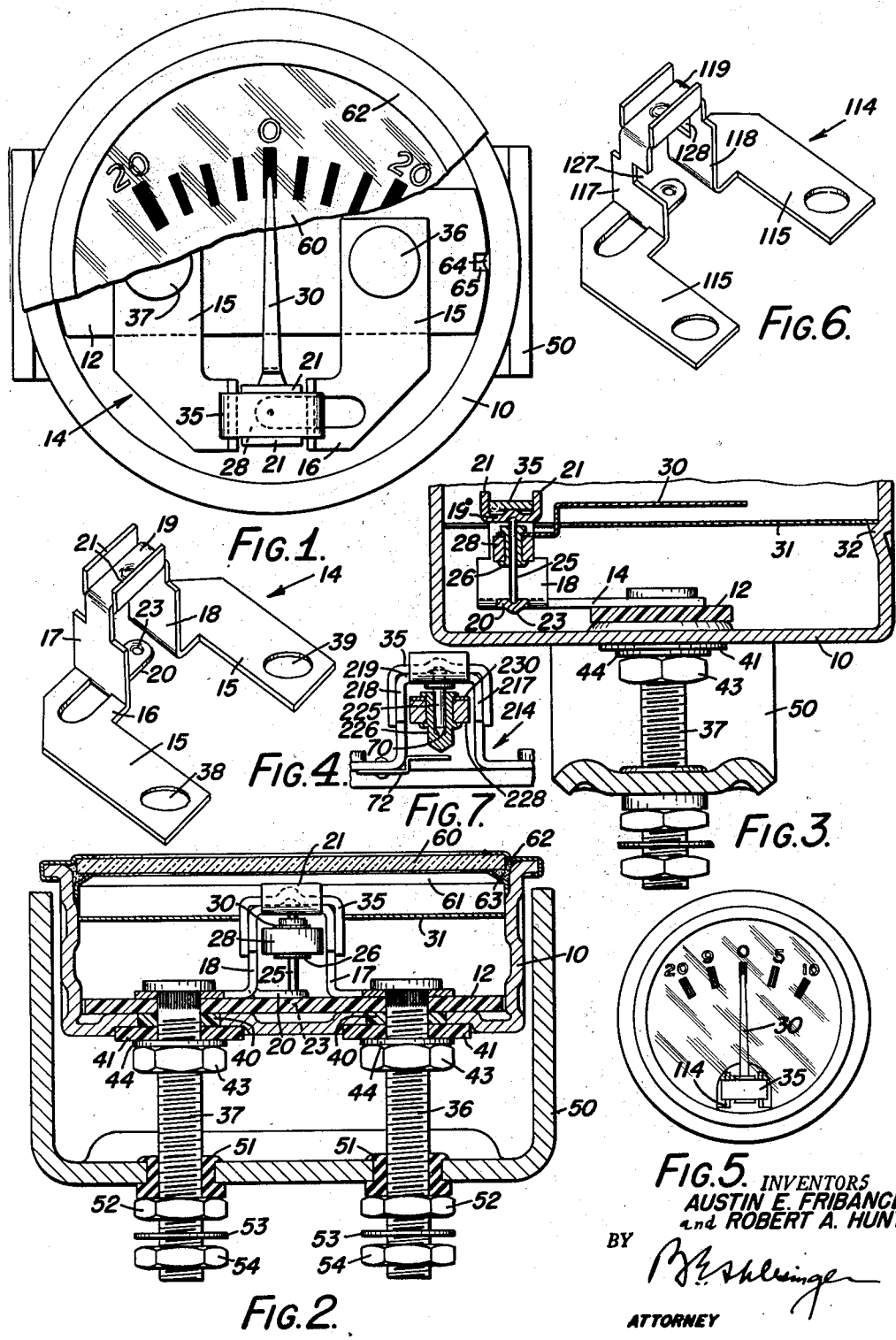
INVENTORS
AUSTIN E. FRIBANCE
and ROBERT A. HUNT
BY
ATTORNEY

United States Patent Office 2,867,768
Patented Jan. 6, 1959

2,867,768

AMMETER

Austin E. Fribance, Rochester, and Robert A. Hunt, Penfield, N. Y., assignors to Rochester Manufacturing Company, Inc., Rochester, N. Y., a corporation of New York Application January 19, 1953, Serial No. 331,912

5 Claims. (Cl. 324—146)

The present invention relates to electrical indicating instruments and more particularly to ammeters. In a still more specific aspect, the present invention relates to ammeters suitable for service under hard use, and where considerable vibration is likely to be encountered, as, for instance, on agricultural tractors and similar powered machinery.

In conventional ammeters designed for usage where the ammeter may be subjected to severe vibration as, for instance, in tractor service, it is necessary to use a dampening fluid, such as silicone oil, in the bearings in order to eliminate vibration of the indicator needle or pointer. This oil must have sufficient viscosity to prevent it from running out of the bearing and to effect proper dampening, but the very viscosity of the oil causes a drag on the pointer and prevents the pointer from returning to zero.

One object of the present invention is to provide an ammeter with a good zero, that is, an ammeter in which the indicator needle or pointer will return accurately to zero when the power is shut off.

Another object of the invention is to provide an ammeter which can be easily calibrated for measurement of different ranges of current.

Another object of the invention is to provide an ammeter which will operate with an unbalanced scale.

A further object of the invention is to provide an ammeter which can have a non-linear scale.

Another object of the invention is to provide an ammeter which can be calibrated with either a linear scale or with a scale that is expanded near the center and contracted near its ends.

Another object of the invention is to provide an ammeter which can be calibrated more quickly, which is better adapted to production needs, and which is less likely to cause trouble because of calibration than conventional meters of this type.

Still another object of the invention is to provide an ammeter that has fewer parts than conventional meters and that can be built easily and at relatively low cost.

Other objects of the invention will be apparent hereinafter from the specification and from the recital of the appended claims.

In the drawing:

Fig. 1 is an elevational view, partly broken away, showing an ammeter constructed according to one embodiment of this invention;

Fig. 2 is a transverse section through this ammeter and through its mounting bracket;

Fig. 3 is a fragmentary section taken at right angles to the section of Fig. 2;

Fig. 4 is a perspective view of the current conducting bracket employed in this embodiment of the invention;

Fig. 5 is an elevational view, showing on a smaller scale an ammeter constructed according to a further embodiment of the invention;

Fig. 6 is a perspective view of the current conducting bracket employed in this latter embodiment of the invention; and Fig. 7 is a fragmentary section showing a modified way of mounting the pointer and the rotary magnet.

Referring now to the drawing by numerals of reference, 10 denotes the ammeter casing. Secured to the base of the casing against an insulator strip 12 is a current conducting bracket 14. This bracket is of general horseshoe shape as clearly shown in Fig. 4. The bracket 14 has parallel legs 15 lying in the same plane, and a transverse portion 16 connecting these legs. This transverse portion is bent upwardly intermediate its ends to provide two parallel portions 17 and 18 and a bridging portion 19 which connects the two portions 17 and 18. The connecting portion 16 has a lug or tab 20 struck from it and bent inwardly to extend between the two upright portions 17 and 18 parallel to and beneath bridging portion 19. The bridging portion 19 has portions 21 bent upwardly therefrom along its opposite parallel side edges.

The lug or tab 20 is recessed or dimpled as denoted at 23, and the bridged portion 19 has an aligned recess or dimple formed therein. They serve as bearings for the opposite ends of a stem or shaft 25. Fixedly secured to the stem or shaft 25 is a bushing or spool 26 on which is mounted a permanent bipolar magnet 28. The magnet 28 is preferably generally oval in shape and has opposite magnetic poles at opposite ends of its major axis. Secured upon the spool 26 above the magnet 28 in fixed relation to the magnet is the indicator pointer or needle 30. The needle is secured so that its center line is at right angles to the axis of magnet 28. The needle is adapted to read against the graduated dial 31 that is mounted in the casing 10 on lugs 32 struck internally therefrom.

Mounted in the channel formed by wings 21 of the bridging portion 19 of the bracket, and straddling the legs 17 and 18 of the bracket is a U-shaped holding and calibrating magnet 35. This magnet is a permanent magnet and has sufficient magnetic force to return the needle or pointer 30 to zero, and to hold said needle or pointer, normally at the zero point of the scale 31 of the ammeter.

The bracket 14 is a conductor and is adapted to conduct electric current in one direction or the other to actuate the pointer against the holding force of the permanent magnet 35. The terminal posts or studs 36 and 37, which serve to secure the bracket in the casing 10, connect the bracket to the source of current and conduct the current to and from the bracket. The studs 36 and 37 pass through holes 38 and 39, respectively, in the legs 15 of the bracket. The terminal studs 36 and 37 pass through holes in the casing 10 and each is insulated therefrom by the insulating strip 12, an insulating washer or disc 40 and an insulating washer or disc 41. The bracket 14 is clamped tightly in engagement with the studs 36 and 37 by nuts 43 and lock washers 44.

Terminal studs 36 and 37 may also serve to connect the casing to a mounting bracket 50 that is secured, for instance, to the dashboard of the tractor or other apparatus on which the ammeter is used. The terminal studs 36 and 37 pass through rubber insulating spools 51 in the bracket 50; and the ammeter is clamped to the dashboard by these studs and by lock-nuts 52.

The ammeter is a remote indicating device, and may be connected to the battery of a tractor or other automotive vehicle, for example, to indicate whether the battery is charging or discharging, and the rate of charge or discharge. The ammeter may be connected in conventional manner in series with the battery and the ignition switch of the vehicle through electric wires and terminal clips that are fastened to the terminal studs 36 and 37 by washers 53 and nuts 54.

When the current flows in one direction, as where the battery of the automotive vehicle is being charged the current will flow from terminal 37 through one leg 15 of the bracket 14, upright portion 18 thereof, bridge portion 19, upright portion 17, and the other leg 15 to terminal stud 36. This will cause rotation of the pointer 30 by magnetic attraction on the magnet 28 so that the needle will indicate the rate of charge. When for any reason the rate of discharge is greater than the rate of charge, the current will flow in the opposite direction through the bracket 14, causing the pointer to swing to the left, as viewed in Fig. 1, and to indicate discharge and the amount thereof.

The casing 10 is closed by a crystal 60, which seats on a seating ring 61, and which is held in place by a bezel 62. Plastic sealing compound 63 that is vulcanized to the bezel is provided to take up shocks between the casing and the bezel. Insulating strip 12 extends diametrically across the casing and is held against rotation in the casing by the teats 64 (Fig. 1) peened inwardly in the casing which engage in recesses 65 in strap 12.

The meter may be calibrated by passing a permanent magnet or an electromagnet over its face. This tends to demagnetize the permanent magnet 35. By controlling the amount of demagnetization various ranges are achieved. By weakening or strengthening the holding magnet, which is done by demagnetizing it or remagnetizing it, it is possible to calibrate the meter for various ranges such as 10—0—10 amperes, 20—0—20, 30—0—30, amperes indication etc.

By arranging the holding magnet 35 as shown with a minimum air gap between this magnet and the permanent magnet 28, a strong magnetic field is set up which positively returns the pointer to zero. On the other hand, by directing the path of current as closely as possible to the magnet 28 through use of conductor bracket 14, it is possible to set up a strong field force or torque force which pulls the pointer away from zero an amount corresponding to the amount of current sent through the bracket.

In some instances, it may be desirable to provide the meter with an unbalanced scale. Figs. 5 and 6 show a meter with such a scale. This meter may be of the same construction as that already described except for the conductor bracket and the scale.

The conductor bracket of this modification is denoted at 114. This bracket has parallel legs 115, upright portions 117 and 118, and a connecting bridge portion 119. It is the same in structure as bracket 14 except that the upright portions 117 and 118, which correspond to portions 17 and 18 of the bracket 14, are notched, as indicated at 127 and 128, at opposite edges thereof. This, of course, causes a diversion of the path of the current with the result that less current is required to move the pointer 30 to the right from zero than to the left. As a result, the scale can be unbalanced, as shown in Fig. 5. In the embodiment shown in Figs. 5 and 6, a meter had ten amperes full scale on one side and twenty amperes full scale on the other side thereof.

In either embodiment of the invention it is possible to provide an accurate return to zero when power is off, because the current strap is close to the magnet 28, forming a U about it. In this way, the current is brought up around three sides of the magnet 28. This makes the torque available to return the pointer so great that the effect of any magnetic field set up in the casing 10 is negligible. It also makes the meter insensitive to vibration and gives it a good return to zero. The magnetic return is an important feature of the present invention. With the arrangement shown, because the conductor is close to the magnetic armature a large torque is developed which permits of using a strong restoring torque, that is, a strong zeroizing magnet. This is important in agricultural machinery where low charge rates and accurate indications are highly desirable.

The use of a magnetic, or live armature 28, and a closely linked current strap 14, or 114, with the resulting powerful movement give several other advantages as well. With the construction described it is possible to use a cheap, non-adjustable bearing plate instead of the screw type adjustable bearings heretofore required. A heavy dampening fluid can be used for good vibration resistance while still having a meter with a fast response. Furthermore the meter is not easily affected by external electrical means.

By changing the relative position of the armature and current strap the ammeter can be calibrated with either a non-linear or a linear scale. If the shaft 25 is displaced so that it is not located at the geometric center of the bridge portion 19, then a scale having expanded graduations at its center and compressed graduations at its ends can be used. In addition, by notching the legs of the current strap, as described, the meter can be made with different scales on each side of center. Varying the amount of the notching influences the variety of scales obtainable each side of center.

For heavy duty installations as, for instance, on big farm tractors where the ammeter is likely to be subjected to much vibration, we prefer to mount the rotary magnet and the pointer or needle as shown in Fig. 7. Here a current conducting bracket 214 is employed which may be similar to either bracket 14 or bracket 114 heretofore described. Bracket 214 has a bridging portion 219 connecting its upright portions 217 and 218; and this bridging portion carries a U-shaped holding magnet 35, as before.

In this embodiment of the invention, however, the pointer and rotary permanent magnet armature rotate about the axis of a stationary shaft 225 which is riveted or otherwise secured at its upper end to the bridging portion 219 of the conducting bracket and which depends from bridging portion 219 midway between the upright portions 217 and 218 of the conducting bracket. This shaft 225 is pointed at its lower end. It carries a preferably aluminum bushing or hub 226 to which is staked the magnetic armature 228. The pointer or needle 230 is staked or welded to this armature.

There is a clearance in the order of 002" between the shaft 225 and the hole 70 in the hub 226 which receives the same; and the shaft 225 and this hole are both coated with a vibration-dampening lubricant such as silicone oil before the hub or bushing is mounted on the shaft. The drop or so of silicone oil that can be put between each end of shaft 25 (Fig. 3) and its bearings in lug or tab 20 and bridging portion 19 may be dislodged if an ammeter with a pointer mounting such as shown in Fig. 3 is used under conditions of severe vibration. When the pointer is mounted as shown in Fig. 7, lubricant is pocketed at the bottom of the hole 70 in the hub and extends the whole length of the shaft 225, providing a large lubricated area. Moreover, it is virtually impossible for the lubricant to leak away even upon the most serious jar.

The mounting of Fig. 7 is moreover simpler. There are no two spaced bearings to be aligned accurately axially with one another. There is no delicate shaft to assemble between these two bearings. The pointer assembly comprising hub, armature, magnet and pointer can be assembled together at the bench and then slipped as a unit over shaft 225. The assembly does not even have to be fastened in place. The pull of magnet 35 on magnet 228 is sufficient to hold the pointer assembly in place. The bottom of the hole 70 in the hub is preferably shaped to have a larger cone angle than the cone angle of the bottom of shaft 225 so that when the hub is pulled up against the pointed bottom of shaft 225 the hub has in effect a point bearing on the shaft. To prevent the hub assembly from dropping out should the ammeter be dropped in handling a strip 72 is provided that is riveted to conducting bracket 214 and that extends underneath the hub 226.

The meter of the present invention has a minimum of parts, making it possible to produce it easily and inexpensively.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described our invention, what we claim is:

1. An electric meter comprising a pivoted, polarized, magnetic armature, a single current conducting strap disposed in operative relation to said armature and having parallel portions at opposite sides, respectively, of the pivotal axis of said armature and a bridging portion extending over said armature and connecting said parallel portions, said strap being so disposed relative to said armature that the axis of said armature is disposed in a central plane of said strap, a pointer operatively connected to said armature, and a U-shaped, permanent, holding magnet carried by said conducting strap and arranged in operative relation to said armature to influence it constantly toward its starting position, said holding magnet having its legs lying outside of and alongside the parallel portions of said strap and having the portion, which connects its legs, resting on the bridging portion of said strap.

2. An electric meter comprising a pivoted, polarized, magnetic armature, a current conducting strap disposed in operative relation to said armature and having parallel portions disposed at diametrally opposite sides respectively, of the pivotal axis of said armature and a bridging portion extending over said armature and connecting said parallel portions, said parallel portions extending parallel to the axis of said armature and having front and rear edges, one of said parallel portions having a recess in registry with said armature and extending from its front edge rearwardly, and the other parallel portion having a corresponding recess also in registry with said armature but extending from its rear edge forwardly whereby the air gap between said armature and said strap will be greater on swing of said armature in one direction from center than upon swing in the opposite direction, a pointer operatively connected to said armature, a permanent, holding magnet disposed in operative relation to said armature to influence it constantly toward its starting position, and a scale against which said pointer reads and which is graduated non-uniformly at opposite sides of center.

3. An electric meter comprising a pivoted, polarized, magnetic armature, a current conducting strap disposed in operative relation to said armature and having parallel portions disposed at diametrally opposite sides, respectively, of the pivotal axis of said armature and a bridging portion extending over said armature and connecting said parallel portions, said parallel portions extending parallel to the axis of said armature and having front and rear edges, one of said parallel portions having a recess in registry with said armature and extending from its front edge rearwardly, and the other parallel portion having a corresponding recess also in registry with said armature but extending from its rear edge forwardly, whereby the air gap between said armature and said strap will be greater on swing of said armature in one direction from center than upon swing in the opposite direction, a pointer operatively connected to said armature, a U-shaped, permanent holding magnet carried by said conducting strap and arranged in operative relation to said armature to influence it constantly toward its starting position, said holding magnet having its legs lying outside of and alongside the parallel portions of said strap and having the portion, which connects said legs, resting on the bridging portion of said strap, and a scale against which said pointer reads and which is graduated non-uniformly at opposite sides of center.

4. An ammeter comprising a pivoted, polarized, magnetic armature, a current conducting strap disposed in operative relation to said armature and having parallel portions at opposite sides of the pivotal axis of said armature and a bridging portion extending over said armature and connecting said parallel portions, a pointer operatively connected to said armature, a graduated dial against which said pointer reads, a U-shaped, permanent holding magnet carried by said conducting strap and arranged in operative relation to said armature to influence it constantly toward its starting position, said holding magnet having its legs lying outside of and alongside the parallel portions of said strap and having the portion, which connects said legs, resting on the bridging portion of said strap, and means whereby more current is required to move said armature the same distance in one direction from center than in the other, said dial being graduated differently accordingly at opposite sides of center.

5. An indicator comprising a conductor for electric current having spaced leg portions and a bridging portion connecting said spaced leg portions, a shaft secured at one end to said bridging portion and depending therefrom between said spaced leg portions and having a conically pointed opposite end, a hub rotatably mounted on said shaft and having a hole to receive said shaft, said hole having a conical bottom of larger cone angle than the cone angle of the pointed end of said shaft, a polarized magnetic armature secured to said hub, a pointer secured to said hub, and a permanent magnet mounted on said bridging portion in operative relation to said armature to hold said hub on said shaft and to urge said armature to its zero position.

References Cited in the file of this patent

UNITED STATES PATENTS

| | | |
|---|---|---|
| 414,866 | Mehren | Nov. 12, 1889 |
| 1,193,096 | West | Aug. 1, 1916 |
| 1,723,035 | Helgeby | Aug. 6, 1929 |
| 1,761,917 | Helgeby | Jan. 3, 1930 |
| 1,805,447 | Eshbaugh | May 12, 1931 |
| 2,139,997 | Carson | Dec. 13, 1938 |
| 2,284,045 | Connolly | May 26, 1942 |
| 2,446,431 | Pfeffer | Aug. 3, 1948 |